US008691463B2

(12) United States Patent
Edlund

(10) Patent No.: US 8,691,463 B2
(45) Date of Patent: Apr. 8, 2014

(54) THERMALLY PRIMED HYDROGEN-PRODUCING FUEL CELL SYSTEM

(75) Inventor: David J. Edlund, Hopkinton, MA (US)

(73) Assignee: DCNS SA, La Montagne (FR)

( * ) Notice: Subject to any disclaimer, the term of this patent is extended or adjusted under 35 U.S.C. 154(b) by 0 days.

(21) Appl. No.: 13/168,751

(22) Filed: Jun. 24, 2011

(65) Prior Publication Data

US 2011/0256459 A1  Oct. 20, 2011

Related U.S. Application Data

(60) Continuation of application No. 12/701,757, filed on Feb. 8, 2010, now Pat. No. 7,977,000, which is a division of application No. 11/229,365, filed on Sep. 16, 2005, now Pat. No. 7,659,019.

(51) Int. Cl.
*H01M 8/04* (2006.01)

(52) U.S. Cl.
USPC ............ 429/442; 429/433; 429/428; 429/408

(58) Field of Classification Search
USPC ........... 429/428, 433, 442, 408; 422/625, 629
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 3,857,735 A | 12/1974 | Louis et al. |
| 3,980,452 A | 9/1976 | Krumm et al. |

(Continued)

FOREIGN PATENT DOCUMENTS

| | | |
|---|---|---|
| DE | 10237154 | 3/2004 |
| JP | S61-82678 | 4/1986 |

(Continued)

OTHER PUBLICATIONS

English-language abstract of Japanese Patent Publication No. 2003-203658, Jul. 18, 2003.

(Continued)

*Primary Examiner* — Zachary Best
(74) *Attorney, Agent, or Firm* — Dascenzo Intellectual Property Law, P.C.

(57) ABSTRACT

Thermally primed fuel processing assemblies and hydrogen-producing fuel cell systems that include the same. The thermally primed fuel processing assemblies include at least one hydrogen-producing region housed within an internal compartment of a heated containment structure. In some embodiments, the heated containment structure is an oven. In some embodiments, the compartment also contains a purification region and/or heating assembly. In some embodiments, the containment structure is adapted to heat and maintain the internal compartment at or above a threshold temperature, which may correspond to a suitable hydrogen-producing temperature. In some embodiments, the containment structure is adapted to maintain this temperature during periods in which the fuel cell system is not producing power and/or not producing power to satisfy an applied load to the system. In some embodiments, the fuel cell system is adapted to provide backup power to a power source, which may be adapted to power the containment structure.

28 Claims, 3 Drawing Sheets

(56) References Cited

U.S. PATENT DOCUMENTS

| | | | |
|---|---|---|---|
| 4,098,959 | A | 7/1978 | Fanciullo |
| 4,098,960 | A | 7/1978 | Gagnon |
| 4,175,165 | A | 11/1979 | Adlhart |
| 4,214,969 | A | 7/1980 | Lawrance |
| 4,238,403 | A | 12/1980 | Pinto |
| 4,381,641 | A | 5/1983 | Madgavkar et al. |
| 4,468,235 | A | 8/1984 | Hill |
| 4,533,607 | A | 8/1985 | Sederquist |
| 4,567,857 | A | 2/1986 | Houseman et al. |
| 4,642,273 | A | 2/1987 | Sasaki |
| 4,644,751 | A | 2/1987 | Hsu |
| 4,650,814 | A | 3/1987 | Keller |
| 4,670,359 | A | 6/1987 | Beshty et al. |
| 4,781,241 | A | 11/1988 | Misage et al. |
| 4,946,667 | A | 8/1990 | Beshty |
| 5,200,278 | A | 4/1993 | Watkins |
| 5,229,222 | A | 7/1993 | Tsutsumi et al. |
| 5,335,628 | A | 8/1994 | Dunbar |
| 5,366,818 | A | 11/1994 | Wilkinson et al. |
| 5,366,821 | A | 11/1994 | Merritt et al. |
| 5,401,589 | A | 3/1995 | Palmer et al. |
| 5,417,051 | A | 5/1995 | Ankersmit et al. |
| 5,432,710 | A | 7/1995 | Ishimaru et al. |
| 5,527,632 | A | 6/1996 | Gardner |
| 5,637,414 | A | 6/1997 | Inoue et al. |
| 5,658,681 | A | 8/1997 | Sato et al. |
| 5,677,073 | A | 10/1997 | Kawatsu |
| 5,795,666 | A | 8/1998 | Johnssen |
| 5,798,186 | A | 8/1998 | Fletcher et al. |
| 5,861,137 | A | 1/1999 | Edlund |
| 5,897,970 | A | 4/1999 | Isomura et al. |
| 5,985,474 | A | 11/1999 | Chen et al. |
| 5,997,594 | A | 12/1999 | Edlund et al. |
| 6,007,931 | A | 12/1999 | Fuller et al. |
| 6,083,637 | A | 7/2000 | Walz et al. |
| 6,103,411 | A | 8/2000 | Matsubayashi et al. |
| 6,165,633 | A | 12/2000 | Negishi |
| 6,221,117 | B1 | 4/2001 | Edlund et al. |
| 6,319,306 | B1 | 11/2001 | Edlund et al. |
| 6,376,113 | B1 | 4/2002 | Edlund et al. |
| 6,383,670 | B1 | 5/2002 | Edlund et al. |
| 6,465,118 | B1 | 10/2002 | Dickman et al. |
| 6,494,937 | B1 | 12/2002 | Edlund et al. |
| 6,495,277 | B1 | 12/2002 | Edlund et al. |
| 6,562,111 | B2 | 5/2003 | Edlund et al. |
| 6,926,748 | B2 | 8/2005 | Goebel et al. |
| 7,198,862 | B2 * | 4/2007 | Baumann et al. ............ 429/412 |
| 7,659,019 | B2 * | 2/2010 | Edlund ........................ 429/411 |
| 2002/0059753 | A1 | 5/2002 | Ichikawa |
| 2002/0162694 | A1 * | 11/2002 | Iwasaki ........................ 180/65.3 |
| 2003/0019156 | A1 | 1/2003 | Takimoto et al. |
| 2003/0159354 | A1 * | 8/2003 | Edlund et al. ............... 48/127.9 |
| 2003/0192251 | A1 * | 10/2003 | Edlund et al. ............... 48/127.9 |
| 2003/0198844 | A1 | 10/2003 | Ukai et al. |
| 2004/0053082 | A1 * | 3/2004 | McCluskey et al. ............ 429/9 |
| 2004/0191591 | A1 * | 9/2004 | Yamamoto .................... 429/19 |
| 2004/0247961 | A1 * | 12/2004 | Edlund .......................... 429/22 |
| 2005/0186455 | A1 | 8/2005 | Kaye et al. |
| 2005/0191534 | A1 * | 9/2005 | Kim et al. ...................... 429/20 |
| 2006/0014061 | A1 * | 1/2006 | Kim et al. ...................... 429/19 |

FOREIGN PATENT DOCUMENTS

| | | | | |
|---|---|---|---|---|
| JP | H09-147897 | 6/1997 | | |
| JP | 09245825 A * | 9/1997 | ............. | H01M 8/04 |
| JP | H09-245825 | 9/1997 | | |
| JP | 2002-255510 | 9/2002 | | |
| JP | 2003-22836 | 1/2003 | | |
| JP | 2003-203658 | 7/2003 | | |
| JP | 2003-288929 | 10/2003 | | |
| JP | 2004-158333 | 6/2004 | | |
| JP | 2004-182528 | 7/2004 | | |
| JP | 2005-44572 | 2/2005 | | |
| JP | 2005-071970 | 3/2005 | | |
| WO | WO 00/04600 | 1/2000 | | |
| WO | WO 02/076883 | 10/2002 | | |
| WO | WO 03/089128 | 10/2003 | | |

OTHER PUBLICATIONS

English-language abstract of Japanese Patent Publication No. 2003-22836, Jan. 24, 2003.

English-language abstract of Japanese Patent No. 5147902, Jun. 1993.

English-language abstract of Japanese Patent No. 6176779, Jun. 1994.

English-language abstract of Japanese Patent No. 7057758, Mar. 1995.

English-language abstract of Japanese Patent No. 8-287932, Nov. 1996.

English-language abstract of German language PCT Patent Publication No. WO 00/04600, Jan. 2000.

Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).

Edlund, David J. and William A. Pledger, "The Practical Use of Metal-Membrane Reactors for Industrial Applications," The 1995 Membrane Technology Reviews, pp. 89-97 (Nov. 1994).

English-language abstract of Japanese Patent Publication No. 2005-228583, Aug. 25, 2005.

English-language abstract of Japanese Patent Publication No. 2005-44572, Feb. 17, 2005.

English-language translation of Japanese Patent Publication No. 2005-44572, Feb. 17, 2005.

English-language abstract of Japanese Patent Publication No. S61-82678, Apr. 26, 1986.

English-language abstract of Japanese Patent Publication No. H09-245825, Sep. 19, 1997.

English-language abstract of Japanese Patent Publication No. 2002-255510, Sep. 11, 2002.

English-language abstract of Japanese Patent Publication No. 2003-288929, Oct. 10, 2003.

English-language abstract of Japanese Patent Publication No. 2004-182528, Jul. 2, 2004.

Certified translation of JP H09-245825, obtained Feb. 7, 2013.

English-language abstract of Japanese Publication No. H09-147897, Jun. 6, 1997.

English-language abstract of Japanese Publication No. 2005-071970, Mar. 17, 2005.

English-language abstract of Japanese Publication No. 2004-158333, Jun. 3, 2004.

* cited by examiner

THERMALLY PRIMED HYDROGEN-PRODUCING FUEL CELL SYSTEM

RELATED APPLICATION

The present application is a continuing patent application of, and claims priority to, U.S. patent application Ser. No. 12/701,757, which was filed on Feb. 8, 2010. The '757 application is a divisional patent application of, and claimed priority to, U.S. patent application Ser. No. 11/229,365, which was filed on Sep. 16, 2005, issued on Feb. 9, 2010 as U.S. Pat. No. 7,659,019. The complete disclosures of the above-identified patent applications are hereby incorporated by reference.

FIELD OF THE DISCLOSURE

The present disclosure is directed generally to hydrogen-producing fuel cell systems, and more particularly, to hydrogen-producing fuel processing systems with thermally primed hydrogen-producing regions.

BACKGROUND OF THE DISCLOSURE

As used herein, a fuel processing assembly is a device or combination of devices that produces hydrogen gas from one or more feed streams that include one or more feedstocks. Examples of fuel processing assemblies include steam and autothermal reformers, in which the feed stream contains water and a carbon-containing feedstock, such as an alcohol or a hydrocarbon. Fuel processors typically operate at elevated temperatures. In endothermic fuel processing reactions, such as in steam reforming fuel processing assemblies, the heat required to heat at least the hydrogen-producing region of the fuel processing assembly to, and maintain the region at, a suitable hydrogen-producing temperature needs to be provided by a heating assembly, such as a burner, electrical heater or the like. When burners are used to heat the fuel processor, the burners typically utilize a combustible fuel stream, such as a combustible gas or a combustible liquid.

In a hydrogen-producing fuel processing assembly that utilizes a steam reformer, or steam reforming region, hydrogen gas is produced from a feed stream that includes a carbon-containing feedstock and water. Steam reforming is performed at elevated temperatures and pressures, and a steam reformer typically includes a heating assembly that provides heat for the steam reforming reaction. Illustrative but not exclusive uses of the heat include maintaining the reforming catalyst bed at a selected reforming temperature, or temperature range, and vaporizing a liquid feed stream prior to its use to produce hydrogen gas. One type of heating assembly is a burner, in which a combustible fuel stream is combusted with air. In a hydrogen-producing fuel processing assembly that utilizes an autothermal reformer, or autothermal reforming region, hydrogen gas is produced from a feed stream that includes a carbon-containing feedstock and water, which is reacted in the presence of air. Steam and autothermal reformers utilize reforming catalysts that are adapted to produce hydrogen gas from the above-discussed feed streams when the hydrogen-producing region is at a suitable hydrogen-producing temperature, or within a suitable hydrogen-producing temperature range. The product hydrogen stream from the hydrogen-producing region may be purified, if needed, and thereafter used as a fuel stream for a fuel cell stack, which produces an electric current from the product hydrogen stream and an oxidant, such as air. This electric current, or power output, from the fuel cell stack may be utilized to satisfy the energy demands of an energy-consuming device.

A consideration with any hydrogen-producing fuel cell system is the time it takes to begin generating an electric current from hydrogen gas produced by the fuel cell system after there is a need to begin doing so. In some applications, it may be acceptable to have a period of time in which there is a demand, or desire, to have the fuel cell system produce a power output to satisfy an applied load, but in which the system is not able to produce the power output. In other applications, it is not acceptable to have a period where the applied load from an energy-consuming device cannot be satisfied by the fuel cell system even though there is a desire to have this load satisfied by the system. As an illustrative example, some fuel cell systems are utilized to provide backup, or supplemental power, to an electrical grid or other primary power source. When the primary power source is not able to satisfy the applied load thereto, it is often desirable for the backup fuel cell system to be able to provide essentially instantaneous power so that the supply of power to the energy-consuming devices is not interrupted, or not noticeably interrupted.

Fuel cells typically can begin generating an electric current within a very short amount of time after hydrogen gas or another suitable fuel and an oxidant, such as air, is delivered thereto. For example, a fuel cell stack may be adapted to produce an electric current within less than a second after the flows of hydrogen gas and air are delivered to the fuel cells in the fuel cell stack. Inclusive of the time required to initiate the delivery of these streams from a source containing the hydrogen gas and air, the time required to produce the electric current should still be relatively short, such as less than a minute. However, hydrogen-producing fuel cell systems that require the hydrogen gas to first be produced, and perhaps purified, prior to being utilized to generate the desired power output take longer to generate this power output. When the fuel processing assembly is already at a suitable hydrogen-producing temperature, the fuel cell system may be able to produce the desired power output from hydrogen gas generated by the fuel processing assembly within a few minutes, or less. However, when the hydrogen-producing fuel processor of the fuel cell system's fuel processing assembly is not already at a desired hydrogen-producing temperature, the required time will be much longer. For example, when started up from an ambient temperature of 25° C., it may take thirty minutes or more to properly start up the fuel processing assembly and to produce the desired power output from hydrogen gas produced by the fuel processing assembly.

Conventionally, several different approaches have been taken to provide hydrogen-producing fuel cell systems that can satisfy an applied load while the associated hydrogen-producing fuel processing assembly is started up from its off, or unheated and inactive, operating state, heated to a suitable hydrogen-producing temperature, and thereafter utilized to produce and optionally purify the required hydrogen gas to produce a power output to satisfy the applied load. One approach is to include one or more batteries or other suitable energy storage devices that may be used to satisfy the applied load until the fuel cell system can produce a sufficient power output to satisfy the applied load. Typically, this approach also requires that the fuel cell system include suitable chargers to recharge the batteries during operation of the fuel cell system. This approach is effective, especially for lower power demands of 1 kW or less, so long as the weight and size requirements of the battery, or batteries, is acceptable. In portable fuel cell systems and fuel cell systems that are designed to satisfy greater applied loads, such as loads of 10 kW or more, it may not be practical to utilize batteries to satisfy an applied load for the time required for the fuel processing assembly to be started up. Another approach is for the fuel processing assembly to include a hydrogen storage device that is sized and otherwise configured to store a sufficient amount of hydrogen gas to supply the fuel cell stack while the fuel processing assembly is started up. Typically, this approach also requires that the fuel cell system include suitable compressors and other control and regulation structure to recharge the storage device. This approach is also effective, but requires that the space, additional equipment and expense of including the storage device and associated components is acceptable.

In some applications, it may be desirable to be able to produce a desired power output from hydrogen gas produced by the fuel processing assembly of a hydrogen-producing fuel cell system without requiring either stored hydrogen or stored power to be used to satisfy the applied load while the fuel processing assembly is started up from an inactive, or off, operating state and heated to a suitable hydrogen-producing temperature.

SUMMARY OF THE DISCLOSURE

The present disclosure is directed to thermally primed fuel processing assemblies and to hydrogen-producing fuel cell systems that include the same. The thermally primed fuel processing assemblies include at least one hydrogen-producing region, such as may be adapted to produce hydrogen gas by a steam reforming or autothermal reforming process utilizing a suitable reforming catalyst. At least the hydrogen-producing region is housed within an internal compartment of a heated containment structure. In some embodiments, the containment structure may be a heated and insulated containment structure. In some embodiments, the heated containment structure is an oven. In some embodiments, at least one purification region and/or heating assembly is contained within the internal compartment with the hydrogen-producing region. In some embodiments, the containment structure is adapted to heat and maintain the internal compartment at or above a threshold temperature, or within a selected temperature range, which in some embodiments may correspond to a suitable hydrogen-producing temperature or temperature range for the hydrogen-producing region. In some embodiments, the containment structure is adapted to maintain the internal compartment at this temperature, or temperature range, during periods in which the fuel cell system is not producing a power output and/or not producing a power output to satisfy an applied load to the system. In some embodiments, the fuel cell system is adapted to provide backup, or supplemental, power to a primary power source that is adapted to provide power to at least one energy-consuming device, and in some embodiments, the primary power source is further adapted to provide power to the containment structure.

DETAILED DESCRIPTION AND BEST MODE OF THE DISCLOSURE

Figure 1:
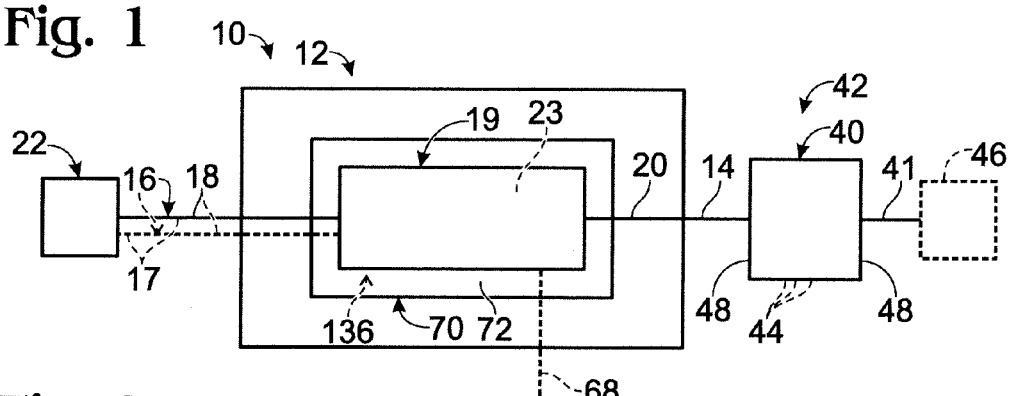
FIG. 1 is a schematic view of a thermally primed hydrogen-producing fuel cell system according to the present disclosure.

A thermally primed fuel processing assembly is shown in FIG. 1 and is indicated generally at 10. Thermally primed fuel processing assembly 10 includes a thermally primed fuel processor 12 that is adapted to produce a product hydrogen stream 14 containing hydrogen gas, and preferably at least substantially pure hydrogen gas, from one or more feed streams 16. Feed stream 16 includes at least one carbon-containing feedstock 18, and may include water 17. Fuel processor 12 is any suitable device, or combination of devices, that is adapted to produce hydrogen gas from feed stream(s) 16. Accordingly, fuel processor 12 includes a hydrogen-producing region 19, in which a hydrogen gas is produced using any suitable hydrogen-producing mechanism(s) and/or process(es). The product hydrogen stream may be delivered to a fuel cell stack 40, which is adapted to produce an electric current, or power output, 41 from hydrogen gas and an oxidant, such as air. An air stream is illustrated at 43 in FIG. 1 and may be delivered to the fuel cells in the stack via any suitable mechanism or process. Systems according to the present disclosure that include at least one fuel cell stack and at least one thermally primed fuel processing assembly that is adapted to produce hydrogen gas for the at least one fuel cell stack may be referred to as thermally primed hydrogen-producing fuel cell systems. Although a single fuel processor 12 and/or a single fuel cell stack 40 are shown in FIG. 1, it is within the scope of the disclosure that more than one of either or both of these components, and/or subcomponents thereof, may be used.

Thermally primed fuel processing assembly 10 includes a hydrogen-producing region 19 that is housed within a heated containment structure, or heated containment assembly, 70 and which is adapted to produce hydrogen gas from the one or more feed streams by utilizing any suitable hydrogen-producing mechanism(s). As discussed in more detail herein, containment structure 70 defines an internal compartment 72 into which at least the hydrogen-producing region of the fuel processing assembly is located. The containment structure includes a heating assembly that is adapted to heat and maintain the internal compartment, and structures contained therewithin, to a threshold temperature, or temperature range. This threshold temperature, or temperature range may correspond to a suitable hydrogen-producing temperature, or temperature range, for the fuel processing assembly to produce hydrogen gas in its hydrogen-producing region. The containment structure may also be referred to as a heated containment system, and/or a positively heated thermal reservoir that contains at least the hydrogen-producing region of the fuel processing assembly.

Feed stream(s) 16 may be delivered to the hydrogen-producing region of thermally primed fuel processor 12 via any suitable mechanism. While a single feed stream 16 is shown in solid lines in FIG. 1, it is within the scope of the disclosure that more than one stream 16 may be used and that these streams may contain the same or different feedstocks. This is schematically illustrated by the inclusion of a second feed stream 16 in dashed lines in FIG. 1. When feed stream 16 contains two or more components, such as a carbon-containing feedstock and water, the components may be delivered in the same or different feed streams. For example, when the fuel processor is adapted to produce hydrogen gas from a carbon-containing feedstock and water, these components are typically delivered in separate streams, and optionally (at least until both streams are vaporized or otherwise gaseous), when they are not miscible with each other, such as shown in FIG. 1 by reference numerals 17 and 18 pointing to different feed streams. When the carbon-containing feedstock is miscible with water, the feedstock is typically, but is not required to be, delivered with the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single stream.

In FIG. 1, feed stream 16 is shown being delivered to fuel processor 12 by a feedstock delivery system 22, which schematically represents any suitable mechanism, device or combination thereof for selectively delivering the feed stream to the fuel processor. For example, the delivery system may include one or more pumps that are adapted to deliver the components of stream 16 from one or more supplies. Additionally, or alternatively, feedstock delivery system 22 may include a valve assembly adapted to regulate the flow of the components from a pressurized supply. The supplies may be located external of the fuel processing assembly, or may be contained within or adjacent the assembly. When feed stream 16 is delivered to the fuel processor in more than one stream, the streams may be delivered by the same or separate feedstock delivery systems.

Hydrogen-producing region 19 may utilize any suitable process or mechanism to produce hydrogen gas from feed stream(s) 16. The output stream 20 from the hydrogen-producing region contains hydrogen gas as a majority component. Output stream 20 may include one or more additional gaseous components, and thereby may be referred to as a mixed gas stream that contains hydrogen gas as its majority component. As discussed, examples of suitable mechanisms for producing hydrogen gas from feed stream(s) 16 include steam reforming and autothermal reforming, in which reforming catalysts are used to produce hydrogen gas from a feed stream 16 containing a carbon-containing feedstock 18 and water 17. Examples of suitable carbon-containing feedstocks 18 include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

Steam reforming is one example of a hydrogen-producing mechanism that may be employed in hydrogen-producing region 19 in which feed stream 16 comprises water and a carbon-containing feedstock. In a steam reforming process, hydrogen-producing region 19 contains a suitable steam reforming catalyst 23, as indicated in dashed lines in FIG. 1.

In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing a steam reforming hydrogen-producing mechanism. Examples of suitable steam reforming catalysts include copper-zinc formulations of low temperature shift catalysts and a chromium formulation sold under the trade name KMA by Sü-Chemie, although others may be used. The other gases that may be present in the reformate stream include carbon monoxide, carbon dioxide, methane, steam, and/or unreacted carbon-containing feedstock.

Steam reformers typically operate at temperatures in the range of 200° C. and 900° C., and at pressures in the range of 50 psi and 300 psi, although temperatures and pressures outside of this range are within the scope of the disclosure. When the carbon-containing feedstock is methanol, the hydrogen-producing steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the hydrogen-production fluid includes a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen-producing regions. Feed stream 16 is typically delivered to reforming region 19 of fuel processor 12 at a selected pressure, such as a pressure within the illustrative pressure range presented above. Thermally primed fuel processing assemblies according to the present disclosure may therefore be adapted to maintain at least the hydrogen-producing region of the fuel processor at or above a threshold hydrogen-producing temperature that corresponds to one of the above-presented illustrative temperatures, and/or within a selected threshold temperature range that corresponds to one of the above-presented illustrative temperature ranges.

Another suitable process for producing hydrogen gas in the hydrogen-producing region 19 of thermally primed fuel processor 12 is autothermal reforming, in which a suitable autothermal reforming catalyst is used to produce hydrogen gas from water and a carbon-containing feedstock in the presence of air. When autothermal reforming is used, the thermally primed fuel processor further includes an air delivery assembly 68 that is adapted to deliver an air stream to the hydrogen-producing region, as indicated in dashed lines in FIG. 1. Thermally primed fuel processing assemblies may be adapted to maintain hydrogen-producing regions that utilize an autothermal reforming reaction at one of the above-presented illustrative temperatures, or temperature ranges, discussed with respect to hydrogen-producing steam reforming reactions. Autothermal hydrogen-producing reactions utilize a primary endothermic reaction that is utilized in conjunction with an exothermic partial oxidation reaction that generates heat within the hydrogen-producing region upon initiation of the initial hydrogen-producing reaction. Accordingly, even though autothermal hydrogen-producing reactions include an exothermic reaction, a need still exists to initially heat the hydrogen-producing region to at least a minimum suitable hydrogen-producing temperature.

The product hydrogen stream 14 produced by the fuel processing assembly may be delivered to a fuel cell stack 40. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of oxygen (which is typically delivered as an air stream), and to produce an electric current therefrom. This is schematically illustrated in FIG. 1, in which a fuel cell stack is indicated at 40 and produces an electric current, or power output, which is schematically illustrated at 41. Fuel cell stack 40 contains at least one, and typically multiple, fuel cells 44 that are adapted to produce an electric current from an oxidant, such as air, oxygen-enriched air, or oxygen gas, and the portion of the product hydrogen stream 14 delivered thereto. The fuel cells typically are joined together between common end plates 48, which contain fluid delivery/removal conduits, although this construction is not required to all embodiments. Examples of suitable fuel cells include proton exchange membrane (PEM) fuel cells and alkaline fuel cells. Others include solid oxide fuel cells, phosphoric acid fuel cells, and molten carbonate fuel cells.

The electric current, or power output, 41 produced by stack 40 may be used to satisfy the energy demands, or applied load, of at least one associated energy-consuming device 46. Illustrative examples of devices 46 include, but should not be limited to, tools, lights or lighting assemblies, appliances (such as household or other appliances), households or other dwellings, offices or other commercial establishments, computers, signaling or communication equipment, etc. Similarly, fuel cell stack 40 may be used to satisfy the power requirements of fuel cell system 42, which may be referred to as the balance-of-plant power requirements of the fuel cell system. It should be understood that device 46 is schematically illustrated in FIG. 1 and is meant to represent one or more devices, or collection of devices, that are adapted to draw electric current from, or apply a load to, the fuel cell system.

Figure 2:
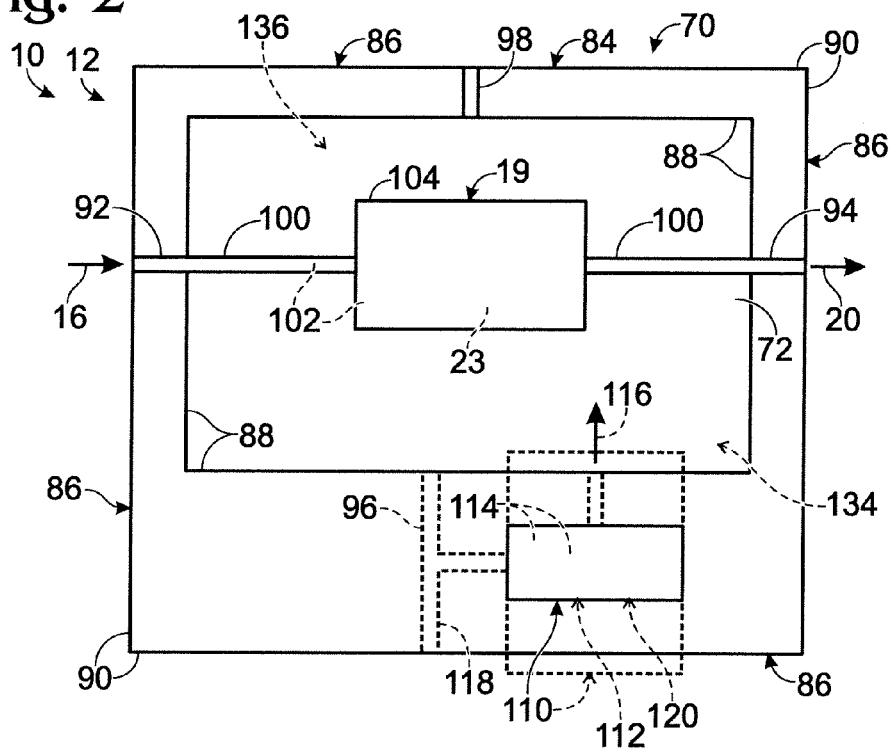
FIG. 2 is a schematic view of a thermally primed hydrogen-producing fuel processing assembly according to the present disclosure.

As discussed, heated containment structure 70 is adapted to heat and maintain at least the hydrogen-producing region of the thermally primed fuel processor at a suitable hydrogen-producing temperature, such as at one of the illustrative temperatures discussed above and/or +/−25° C. of these illustrative temperatures. An illustrative example of a suitable containment structure 70 is schematically illustrated in FIG. 2. As shown, the containment structure defines an enclosure 84 containing internal compartment 72, which is sized to receive, or house, at least the hydrogen-producing region of fuel processor 12. The enclosure includes walls 86, which preferably include internal surfaces 88 that define an at least substantially, if not completely, closed boundary around the internal compartment. It is within the scope of the present disclosure that walls 86 may have the same or different thicknesses, sizes, shapes, and the like. Similarly, it is not required that the enclosure have a rectilinear configuration, with FIG. 2 merely intended to provide an illustrative schematic example.

The walls and/or other portions of enclosure 86 preferably are insulated to reduce the thermal load, or energy demand, to heat and maintain the internal compartment at the selected temperature. Although not required, it is within the scope of the present disclosure that the enclosure, such as walls 86, is/are sufficiently insulated that the exterior surface 90 thereof is maintained at or below a threshold external temperature while the internal compartment is maintained at one of the suitable threshold hydrogen-producing temperatures discussed herein. Illustrative, non-exclusive examples of suitable threshold external temperatures include temperatures of less than 100° C., thresholds of less than 75° C., less than 50° C., and less than 25° C. As discussed, these external temperatures are not required, and the exterior of the enclosure may be at temperatures that exceed these illustrative examples without departing from the scope of the present disclosure.

It is within the scope of the present disclosure that the enclosure 84 may include one or more vents or other air-circulation passages. It is also within the scope of the present disclosure that the only fluid passages between the internal compartment and exterior of the enclosure is through defined inlet and outlet conduits, or ports, such as to deliver feed stream(s) to the hydrogen-producing region, to withdraw the hydrogen-containing stream(s) from the enclosure, and/or to deliver air to into the compartment and to withdraw exhaust from the enclosure. This is somewhat schematically illustrated in FIG. 2, in which a feed stream port is indicated at 92, a product hydrogen port is indicated at 94, an air inlet port is indicated at 96, and an exhaust port is indicated at 98. More than one of the illustrated examples of possible ports may be included in any containment structure according to the present disclosure. Similarly, the structure may include one or more ports in addition to, or instead of, one or more of the illustrative ports described above.

When the fluid streams that are delivered into or withdrawn from a particular structure within the internal compartment, such as instead of the internal compartment generally, the ports may be associated with one or more fluid conduits 100 that define prescribed flow paths for the fluids within the compartment. For example, feed port 92 includes a fluid conduit that delivers the feed stream to the hydrogen-producing region. This conduit may define or otherwise form at least a portion of a vaporization region 102, in which a feed stream that is delivered as a liquid stream is vaporized prior to being delivered into contact with the reforming catalyst in hydrogen-producing region 19. In some embodiments, the vaporization region may be contained within the hydrogen-producing region, with the feed stream being vaporized prior to being delivered into contact with the reforming catalyst. In some embodiments, the feed stream may be a gaseous stream when introduced into the internal compartment and therefore may not need to be vaporized in a vaporization region within the compartment. Also shown in the illustrative example shown in FIG. 2 is a conduit 100 through which the hydrogen gas from the hydrogen-producing region is delivered to hydrogen port 94, which is in fluid communication with the fuel cell stack.

FIG. 2 also illustrates that heated containment structures 70 according to the present disclosure also include, or optionally are in thermal communication with, a heating assembly 110 that is adapted to heat the internal compartment to at least a threshold temperature, such as a suitable hydrogen-producing temperature, during periods in which the hydrogen-producing region is not producing hydrogen gas but in which it is desirable to maintain the hydrogen-producing region in a primed operating state. As discussed, this primed, or thermally primed, operating state may be an operating state in which at least the hydrogen-producing region is maintained at, or within, a suitable hydrogen-producing temperature or range of temperatures. It is within the scope of the present disclosure that heating assembly 110 may be configured to only heat the internal compartment (and its contents) when the hydrogen-producing region is not producing hydrogen gas. However, it is also within the scope of the present disclosure that the heating assembly may be configured to heat the internal compartment (and its contents) until the hydrogen-producing region begins producing hydrogen gas and/or until the fuel cell stack begins producing a sufficient power output to satisfy the applied load to the fuel cell system. As a further illustrative example, the heating assembly may be configured to continue heating the internal compartment and its contents for a selected time period after the above-discussed events occur (or are detected). As still a further example, the heating assembly may be adapted to continue to provide heat to the internal compartment (and its contents) regardless of whether the hydrogen-producing region is producing hydrogen gas and/or the fuel cell stack is producing an electric current, such as if the internal compartment, or a selected region thereof, falls below the threshold temperature (or falls below this temperature by more than a selected temperature range).

As illustrated in the schematic example shown in FIG. 2, the containment structure includes a heating assembly 110 that is adapted to heat the internal compartment 72 of the containment structure, and accordingly, to heat the hydrogen-producing region and any other structure contained in the internal compartment to the selected threshold temperature. In solid lines in FIG. 2, heating assembly 110 is illustrated being located within enclosure 84 and external of the internal compartment 72 of the containment structure. As discussed, this configuration is not required and it is within the scope of the present disclosure that the heating assembly may be partially or completely positioned external of enclosure 84 and/or within internal compartment 72, as schematically represented in dashed lines in FIG. 2.

A suitable structure for heating assembly 110 is an electrically powered heater 112, such as resistance heater that is powered by a suitable power source, such as a battery, an electrical grid, a generator, or any other suitable power source adapted to provide electrical power to the heater. Heater 112 may, but is not required to, generate a heating fluid stream 116 that is delivered into the internal compartment, such as when the heater receives an air stream 118 that is heated and delivered into the internal compartment. Heater 112 and/or any other suitable heating assembly 110 may include one or more heating elements, or heat sources, 114 that may be positioned in any suitable location relative to the internal compartment of the containment structure. For example, the heating assembly may include at least one heating element that is within, or which extends at least partially within, the internal compartment. Additionally or alternatively, the heating assembly may include one or more compartments that extend completely, or at least partially, within one or more walls 86 of the containment structure.

As a further illustrative, non-exclusive example, heating assembly 110 may include a combustion region 120 that generates a heating fluid stream 116 in the form of a combustion exhaust stream that may be delivered to the internal compartment to heat the compartment and structures contained herein. The combustion region may be within the containment structure, within the internal compartment, or may be external the containment structure. In at least this latter example, the combustion exhaust stream may be delivered to the internal compartment through one or more fluid conduits, such as may extend through at least one wall of the containment structure to deliver the combustion exhaust stream into the internal compartment.

Figure 3:
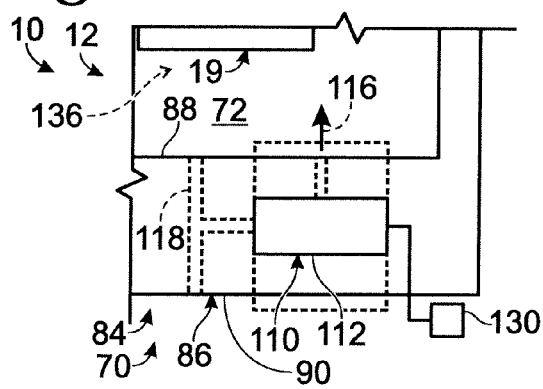
FIG. 3 is a fragmentary schematic view of another thermally primed hydrogen-producing fuel processing assembly according to the present disclosure.

FIG. 3 illustrates an example of a containment structure 70 that includes, or is in thermal communication with, a heating assembly 110 that includes an electrically powered heater 112. As shown, heater 112 is in electrical communication with a power source 130 that is adapted to provide sufficient power to the heater to enable the heater to heat the internal compartment to the selected threshold temperature and to thereafter maintain this temperature and/or a suitable temperature range of the selected threshold temperature, such as ±5° C., ±10° C., or ±25° C. of this temperature. The heating element(s) 114 of the electrical heater may extend in any suitable position relative to the internal compartment. Illustrative, non-exclusive examples of which include positions along or within one or more of the walls 86 of the enclosure and/or within internal compartment 72. As illustrated in dashed lines in FIG. 3, the electrical heater may receive an air stream 118, with the heater heating this stream to produce a heating fluid stream that is delivered into the internal compartment to heat at least the hydrogen-producing region of the thermally primed fuel processing assembly.

Figure 4:
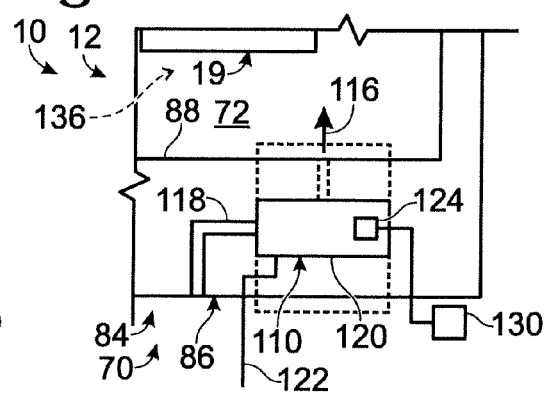
FIG. 4 is a fragmentary schematic view of another thermally primed hydrogen-producing fuel processing assembly according to the present disclosure.

FIG. 4 illustrates an example of a containment structure 70 that includes, or is in thermal communication with, a heating assembly 110 that includes a combustion region 120 that is adapted to receive and combust a combustible fuel stream 122 in the presence of air, such as from an air stream 118, to produce a heating fluid stream 116 in the form of a combustion exhaust stream. Fuel stream 122 may include any suitable combustible fuel, with illustrative examples including gaseous and liquid fuels. Further illustrative examples include feed stream 16, carbon-containing feedstock 18, hydrogen or other gases produced by the hydrogen-producing region, propane, natural gas, gasoline, kerosene, diesel, and the like. The combustion region may be adapted to receive and combust a particular fuel or type of fuel. The combustion region may include an igniter, or other suitable ignition source, 124 that is adapted to initiate combustion of the fuel stream, with it being within the scope of the present disclosure that the igniter is in electrical communication with a power source 130 that is adapted to selectively actuate the igniter. In addition to the previously discussed examples of suitable power sources, the igniter may be adapted to be powered by a flywheel or ultracapacitor.

As discussed above with respect to FIG. 2, heating assemblies may be positioned external, within, and/or internal of the enclosure that defines the internal compartment of the containment structure. Accordingly, the illustrative examples of electrical heaters and combustion regions shown in FIGS. 3 and 4 may be implemented at least partially, if not completely, external of the enclosure, within the enclosure, or within the internal compartment. As also discussed, at least when it is located external of the enclosure, the heating assembly may include at least one fluid conduit to selectively deliver a heating fluid stream to the internal compartment or otherwise into thermal communication with the internal compartment to provide the desired heating of the compartment and its contents. It is further within the scope of the present disclosure that the internal compartment may include one or more sub-compartments, may include one or more heat deflection structures, thermal baffles or barriers, fans or circulation members, and/or other temperature-modulating structures that selectively define regions of higher and lower temperatures within the internal compartment. These optional temperature-modulating structures are schematically illustrated, individually and in combination, in FIG. 2 at 134.

In FIGS. 1-4, thermally primed fuel processing assembly 10 has been described as including at least a hydrogen-producing region 19 that is positioned within the internal compartment of a heated containment structure 70 according to the present disclosure. In each of these Figures, reference numeral 136 is also presented in dashed lines to indicate that other components of the fuel processing assembly may be located within the internal compartment and therefore heated and maintained at a selected threshold temperature and/or within a selected temperature range by heating assembly 110. When present in the internal compartment, these components of the fuel processing assembly should be configured to withstand the temperature that is maintained within the compartment by heating assembly 110. An example of an additional component of the thermally primed fuel processing that, when present, may be (but is not required to be) housed within compartment 72 is a vaporization region, such as schematically illustrated in FIG. 2 at 102. It is within the scope of the present disclosure that vaporization region 102, when present, may be otherwise configured and may, in some embodiments, be located within a common shell, or housing, with the hydrogen-producing region in the internal compartment. In FIG. 2, the shell, or housing, that contains the hydrogen-producing region within the internal compartment is indicated at 104.

Figure 5:
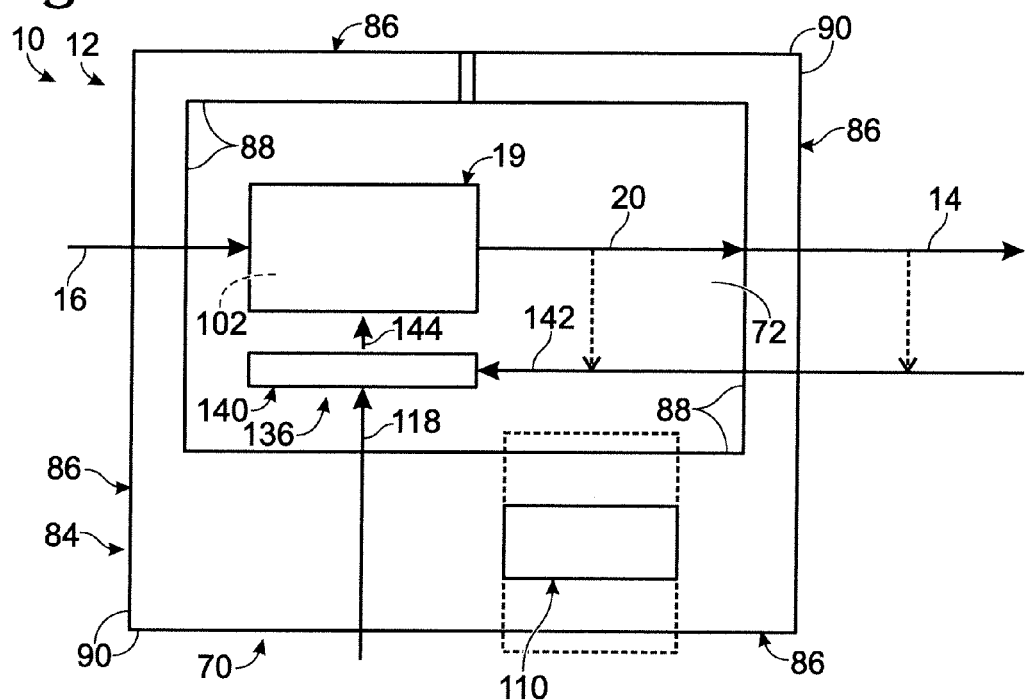
FIG. 5 is a schematic view of portions of another thermally primed hydrogen-producing fuel processing assembly according to the present disclosure

Another example of a component of fuel processing assembly 10 that may (but is not required to) be present in internal compartment 72 is a heating assembly 140 that is adapted to heat at least the hydrogen-producing region when the hydrogen-producing region is in a hydrogen-producing operating state. An illustrative example of such a heating assembly is indicated schematically in FIG. 5. Heating assembly 140 may be referred to as a secondary, or active operating state heating assembly. When present in a particular embodiment of assembly 10, the hydrogen-producing heating assembly is adapted to combust a fuel stream 142 to generate a combustion stream 144 to maintain at least the hydrogen-producing region 19 of fuel processing assembly 10 at a suitable hydrogen-producing temperature or range of temperatures. In such an embodiment, this secondary heating assembly may be referred to as a burner. Heating assembly 140 may utilize air that is delivered by air stream 118 to support combustion, and may utilize an igniter or other suitable ignition source, such as discussed previously with respect to combustion region 120. Fuel stream 142 may include any suitable combustible fuel. While not required to all embodiments, it is within the scope of the present disclosure that the fuel stream may include, or even be completely formed from, at least a portion of output stream 20. It is further which the scope of the present disclosure that this gaseous fuel stream may be supplemented with additional fuel that is delivered to the heating assembly from external the compartment, such as via a suitable port.

It is within the scope of the present disclosure that the hydrogen-producing region may utilize a process that inherently produces sufficiently pure hydrogen gas for use as a fuel stream for fuel cell stack 40. When the output stream contains sufficiently pure hydrogen gas and/or sufficiently low concentrations of one or more non-hydrogen components for use as the fuel stream for fuel cell stack 40, product hydrogen stream 14 may be formed directly from output stream 20. However, in many hydrogen-producing processes, output stream 20 will be a mixed gas stream that contains hydrogen gas as a majority component along with other gases. Similarly, in many applications, the output stream 20 may be substantially pure hydrogen gas but still contain concentrations of one or more non-hydrogen components that are harmful or otherwise undesirable in the application for which the product hydrogen stream is intended to be used.

For example, when stream 14 is intended for use as a fuel stream for a fuel cell stack, such as stack 40, compositions that may damage the fuel cell stack, such as carbon monoxide and carbon dioxide, may be removed from the hydrogen-rich stream, if necessary. For many fuel cell stacks, such as proton exchange membrane (PEM) and alkaline fuel cell stacks, the concentration of carbon monoxide is preferably less than 10 ppm (parts per million). Preferably, the concentration of carbon monoxide is less than 5 ppm, and even more preferably, less than 1 ppm. The concentration of carbon dioxide may be greater than that of carbon monoxide. For example, concentrations of less than 25% carbon dioxide may be acceptable in some embodiments. Preferably, the concentration is less than 10%, and even more preferably, less than 1%. While not required, especially preferred concentrations are less than 50 ppm. The acceptable minimum concentrations presented herein are illustrative examples, and concentrations other than those presented herein may be used and are within the scope of the present disclosure. For example, particular users or manufacturers may require minimum or maximum concentration levels or ranges that are different than those identified herein.

Figure 6:
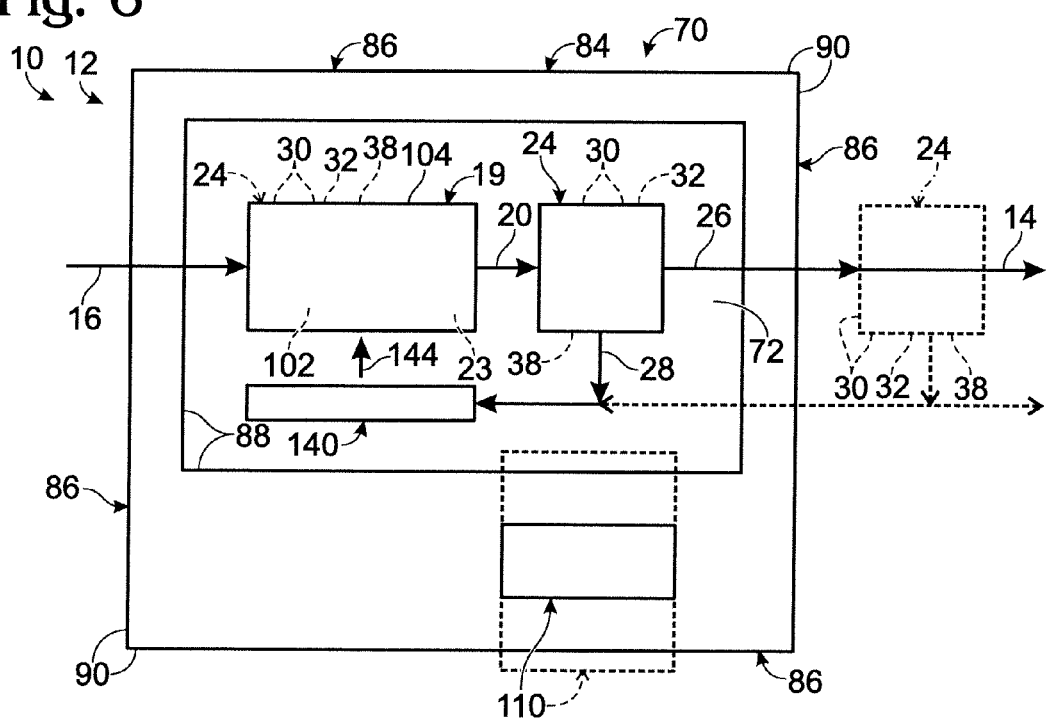
FIG. 6 is a schematic view of another thermally primed hydrogen-producing fuel processing assembly according to the present disclosure.

Accordingly, thermally primed fuel processing assembly 10 may (but is not required to) further include a purification region 24, in which a hydrogen-rich stream 26 is produced from the output, or mixed gas, stream from hydrogen-producing region 19. Hydrogen-rich stream 26 contains at least one of a greater hydrogen concentration than output stream 20 and a reduced concentration of one or more of the other gases or impurities that were present in the output stream. In FIG. 6, the illustrative example of a thermally primed fuel processing assembly shown in FIG. 2 is shown including at least one purification region 24. Purification region 24 is schematically illustrated in FIG. 6, where output, or mixed gas, stream 20 is shown being delivered to an optional purification region 24. As shown in FIG. 6, at least a portion of hydrogen-rich stream 26 forms product hydrogen stream 14. Accordingly, hydrogen-rich stream 26 and product hydrogen stream 14 may be the same stream and have the same compositions and flow rates. However, it is also within the scope of the present disclosure that some of the purified hydrogen gas in hydrogen-rich stream 26 may be stored for later use, such as in a suitable hydrogen storage assembly, and/or consumed by the fuel processing assembly.

Purification region 24 may, but is not required to, produce at least one byproduct stream 28. When present, byproduct stream 28 may be exhausted, sent to a burner assembly or other combustion source (such as a hydrogen-producing heating assembly), used as a heated fluid stream, stored for later use, or otherwise utilized, stored or disposed of It is within the scope of the disclosure that byproduct stream 28 may be emitted from the purification region as a continuous stream responsive to the delivery of output stream 20 to the purification region, or intermittently, such as in a batch process or when the byproduct portion of the output stream is retained at least temporarily in the purification region.

Purification region 24 includes any suitable device, or combination of devices, that are adapted to reduce the concentration of at least one component of output stream 20. In most applications, hydrogen-rich stream 26 will have a greater hydrogen concentration than output, or mixed gas, stream 20. However, it is also within the scope of the present disclosure that the hydrogen-rich stream will have a reduced concentration of one or more non-hydrogen components that were present in output stream 20, yet have the same, or even a reduced overall hydrogen concentration as the output stream. For example, in some applications where product hydrogen stream 14 may be used, certain impurities, or non-hydrogen components, are more harmful than others. As a specific example, in conventional fuel cell systems, carbon monoxide may damage a fuel cell stack if it is present in even a few parts per million, while other non-hydrogen components that may be present in stream 20, such as water, will not damage the stack even if present in much greater concentrations. Therefore, in such an application, a suitable purification region may not increase the overall hydrogen concentration, but it will reduce the concentration of a non-hydrogen component that is harmful, or potentially harmful, to the desired application for the product hydrogen stream.

Illustrative examples of suitable devices for purification region 24 include one or more hydrogen-selective membranes 30, chemical carbon monoxide (or other impurity) removal assemblies 32, and pressure swing adsorption systems 38. It is within the scope of the disclosure that purification region 24 may include more than one type of purification device, and that these devices may have the same or different structures and/or operate by the same or different mechanisms.

Hydrogen-selective membranes 30 are permeable to hydrogen gas, but are at least substantially, if not completely, impermeable to other components of output stream 20. Membranes 30 may be formed of any hydrogen-permeable material suitable for use in the operating environment and parameters in which purification region 24 is operated. Examples of suitable materials for membranes 30 include palladium and palladium alloys, and especially thin films of such metals and metal alloys. Palladium alloys have proven particularly effective, especially palladium with 35 wt % to 45 wt % copper. A palladium-copper alloy that contains approximately 40 wt % copper has proven particularly effective, although other relative concentrations and components may be used within the scope of the disclosure.

Hydrogen-selective membranes are typically formed from a thin foil that is approximately 0.001 inches thick. It is within the scope of the present disclosure, however, that the membranes may be formed from other hydrogen-permeable and/or hydrogen-selective materials, including metals and metal alloys other than those discussed above as well as non-metallic materials and compositions, and that the membranes may have thicknesses that are greater or less than discussed above. For example, the membranes may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117, 6,319,306, and 6,537,352, the complete disclosures of which are hereby incorporated by reference for all purposes.

Chemical carbon monoxide removal assemblies 32 are devices that chemically react carbon monoxide and/or other undesirable components of stream 20, if present in output stream 20, to form other compositions that are not as potentially harmful. Examples of chemical carbon monoxide removal assemblies include water-gas shift reactors and other devices that convert carbon monoxide to carbon dioxide, and methanation catalyst beds that convert carbon monoxide and hydrogen to methane and water. It is within the scope of the disclosure that fuel processing assembly 10 may include more than one type and/or number of chemical removal assemblies 32.

Pressure swing adsorption (PSA) is a chemical process in which gaseous impurities are removed from output stream 20 based on the principle that certain gases, under the proper conditions of temperature and pressure, will be adsorbed onto an adsorbent material more strongly than other gases. Typically, it is the impurities that are adsorbed and removed from output stream 20. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases such as $NH_3$, $H_2S$, and $H_2O$ adsorb very strongly on the adsorbent material and are removed from stream 20 along with other impurities. If the adsorbent material is going to be regenerated and these impurities are present in stream 20, purification region 24 preferably includes a suitable device that is adapted to remove these impurities prior to delivery of stream 20 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. Other suitable adsorbent material compositions, forms, and configurations may be used.

PSA system 38 also provides an example of a device for use in purification region 24 in which the byproducts, or removed components, are not directly exhausted from the region as a gas stream concurrently with the purification of the output stream. Instead, these byproduct components are removed when the adsorbent material is regenerated or otherwise removed from the purification region.

In the illustrative, non-exclusive embodiment shown in FIG. 6, purification region 24 is shown in solid lines within internal compartment 72 and as a separate structure from the housing 104 that contains hydrogen-producing region 19. It is within the scope of the disclosure that housing 104 may additionally or alternatively include a purification region 24 in addition to hydrogen-producing region 19, with the purification region(s) being adapted to receive the mixed gas, or reformate, stream produced in the hydrogen-producing region. It is also within the scope of the present disclosure that the fuel processing assembly may include a purification region 24 that is external of the containment structure's enclosure, such as indicated in dash-dot lines in FIG. 6. Any of the thermally primed fuel processing assemblies described, illustrated and/or incorporated herein may be, but are not required to be, implemented with one or more of the purification regions described, illustrated, and/or incorporated herein.

In the context of a fuel processor, or fuel processing assembly, that is adapted to produce a product hydrogen stream that will be used as a feed, or fuel, stream for a fuel cell stack, the fuel processor preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Suitable fuel processors for producing streams of at least substantially pure hydrogen gas are disclosed in U.S. Pat. Nos. 6,319,306, 6,221,117, 5,997,594, 5,861,137, pending U.S. patent application Ser. No. 09/802,361, which was filed on Mar. 8, 2001 and is entitled "Fuel Processor and Systems and Devices Containing the Same," and U.S. patent application Ser. No. 10/407,500, which was filed on Apr. 4, 2003, is entitled "Steam Reforming Fuel Processor," and which claims priority to U.S. Provisional Patent Application Ser. No. 60/372,258. The complete disclosures of the above-identified patents and patent applications are hereby incorporated by reference for all purposes.

Figure 7:
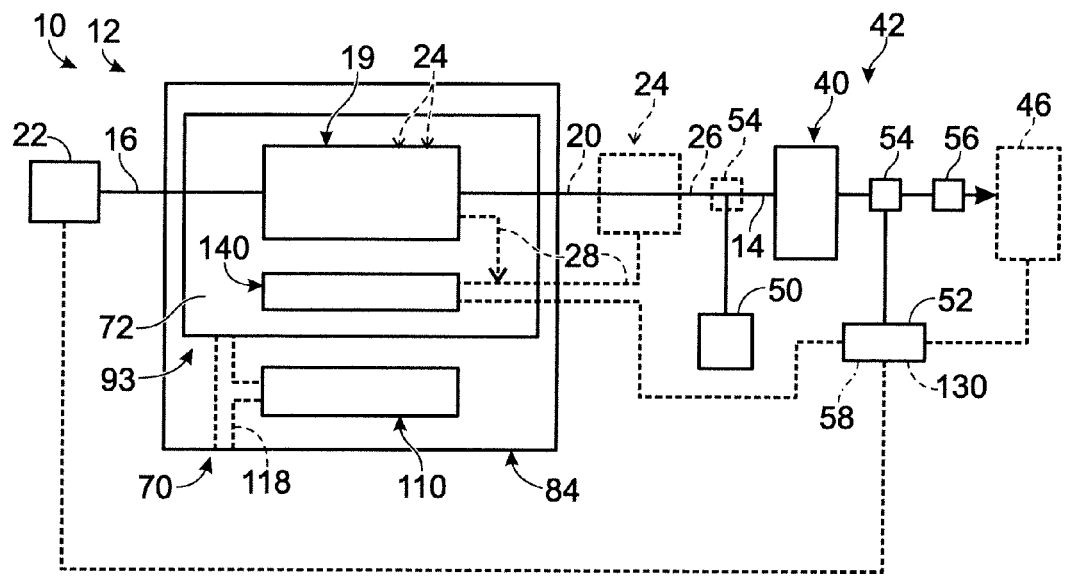
FIG. 7 is a schematic view of a thermally primed hydrogen-producing fuel cell system according to the present disclosure.

FIG. 7 illustrates another example of a fuel cell system 42 that includes a thermally primed fuel processing assembly 10 according to the present disclosure. FIG. 7 is intended to illustrate additional components that may, but are not required in all embodiments, be included in system 42 and/or assembly 10. In other words, it is within the scope of the present disclosure that thermally primed fuel processing assemblies and fuel cell systems containing the same may include additional components besides those described and/or illustrated herein, such as one or more suitable, controllers, flow regulating devices, heat exchangers, heating/cooling assemblies, fuel/feed supplies, hydrogen storage devices, energy storage devices, reservoirs, filters, and the like.

Fuel cell stack 40 may receive all of product hydrogen stream 14. Some or all of stream 14 may additionally, or alternatively, be delivered, via a suitable conduit, for use in another hydrogen-consuming process, burned for fuel or heat, or stored for later use. As an illustrative example, a hydrogen storage device 50 is shown in FIG. 7. Device 50 is adapted to store at least a portion of product hydrogen stream 14. For example, when the demand for hydrogen gas by stack 40 is less than the hydrogen output of fuel processor 12, the excess hydrogen gas may be stored in device 50. Illustrative examples of suitable hydrogen storage devices include hydride beds and pressurized tanks Although not required, a benefit of fuel processing assembly 10 or fuel cell system 42 including a supply of stored hydrogen gas is that this supply may be used to satisfy the hydrogen requirements of stack 40, or the other application for which stream 14 is used, in situations when thermally primed fuel processor 12 is not able to meet these hydrogen demands. Examples of these situations include when the fuel processor is offline for maintenance or repair, and when the fuel cell stack or application is demanding a greater flow rate of hydrogen gas than the maximum available production from the fuel processor. Additionally or alternatively, the stored hydrogen may also be used as a combustible fuel stream to heat the fuel processing assembly or fuel cell system. Fuel processing assemblies that are not directly associated with a fuel cell stack may still include at least one hydrogen storage device, thereby enabling the product hydrogen streams from these fuel processing assemblies to also be stored for later use.

Thermally primed fuel cell system 42 may also include a battery or other suitable energy storage device 52 that is adapted to store the electric potential, or power output, produced by stack 40 and to utilize this stored potential to provide a power source (such as one or more of the previously described power sources 130). For example, device 52 may be adapted to provide power to one or more of an igniter, pump (such as to supply feed stream 16), blower or other air propulsion device (such as to deliver air stream 118), sensor, controller, flow-regulating valve, and the like. Device 52 may be a rechargeable device, and fuel cell system 42 may include a charging assembly that is adapted to recharge the device. It is also within the scope of the present disclosure that device 52 may be present in system 42 but may not be adapted to be recharged by system 42. Similar to the above discussion regarding excess hydrogen gas, fuel cell stack 40 may produce a power output in excess of that necessary to satisfy the load exerted, or applied, by device 46, including the load required to power fuel cell system 42. In further similarity to the above discussion of excess hydrogen gas, this excess power output may be used in other applications outside of the fuel cell system and/or stored for later use by the fuel cell system. For example, the battery or other storage device may provide power for use by system 42 during periods in which the system is not producing electricity and/or hydrogen gas.

When fuel cell system 42 includes a hydrogen storage device 50, the hydrogen storage device may be designed, sized, or otherwise adapted to not be able to satisfy the hydrogen demands of the fuel cell stack during a time period that is equal to the time period in which it would take the fuel cell system to start up from an unheated operating state (i.e., if the system was implemented without a thermally primed fuel processing assembly). This response time may be referred to as a start up response time, in that it includes the time required to heat at least the hydrogen-producing region to a suitable hydrogen-producing temperature. This start up response time is contrasted with the time required to produce hydrogen gas from the thermally primed fuel processing assembly that has been maintained at a suitable hydrogen-producing temperature, and then to generate a power output therefrom. This response time may be referred to as a thermally biased response time.

Therefore, while not required, the fuel cell system may include a hydrogen storage device that has insufficient capacity, even when fully charged, to provide sufficient amounts of hydrogen gas to provide the hydrogen gas required by the fuel cell stack to satisfy the applied load thereto during a time period that is equal to the time that would otherwise be required to start up the fuel cell system from an off, or unheated, operating state. As further illustrative examples, the maximum capacity of the hydrogen-storage device may be selected to be less than 75%, less than 50% or even less then 25% of this potential hydrogen demand. Expressed in slightly different terms, during a time period that corresponds to the time it would take to start up the fuel cell stack from an unheated operating state (i.e., if the thermally primed fuel processor assembly was not present or operational), the fuel cell stack may require a volume of hydrogen gas to generate a sufficient power output to satisfy the applied load thereto, with this volume exceeding the capacity of the hydrogen storage device, and optionally exceeding the capacity of the hydrogen storage device by at least 25%, 50%, 75%, or even 100% of its capacity.

Similarly, when fuel cell system 42 includes an energy storage device 52, such as a battery, capacitor or ultracapacitor, flywheel, or the like, this device may have a maximum charge that is less than the power output that would be required to satisfy the applied load to the fuel cell stack during a time period that corresponds to the time that would be required to startup the fuel cell system from an unheated, off operating state (i.e., if the thermally primed fuel processing assembly was not present). It is within the scope of the present disclosure that this maximum charge may be less than the required power output by at least 25%, 50%, 75%, or more. Expressed in slightly different terms, during a time period that corresponds to the time it would take to start up the fuel cell stack from an unheated (off and/or unprimed) operating state (i.e., if the thermally primed fuel processing assembly was not present), the energy-consuming device may demand, or require, a power output that exceeds the maximum (i.e., fully charged) capacity of the energy-storage device.

This intentional undersizing of devices 50 and/or 52 is not required, especially since these components are not required to all embodiments. However, the above discussion demonstrates that it is within the scope of the present disclosure to include a hydrogen storage device and/or energy storage device while still requiring the heated containment assembly for the system to be properly operational. A related consideration is the cost and/or space required for these components if they were sized to provide a fuel cell system that did not include a heated containment structure according to the present disclosure.

In FIG. 7, optional flow-regulating structures are generally indicated at 54 and schematically represent any suitable manifolds, valves, controllers, switches and the like for selectively delivering hydrogen gas and the fuel cell stack's power output to device 50 and battery 52, respectively, and to draw the stored hydrogen and stored power output therefrom. Also shown in FIG. 7 is an optional, and schematically illustrated, example of a power management module 56 that is adapted to regulate the power output from the fuel cell stack, such as to filter or otherwise normalize the power output, to convert the power output to a higher or lower voltage, to convert the power output from a DC power output to an AC power output, etc.

Thermally primed fuel processing assemblies, and fuel cell systems incorporating the same, may also include or be in communication with a controller that is adapted to selectively control the operation of the assembly/system by sending suitable command signals and/or to monitor the operation of the assembly/system responsive to input from various sensors. A controller is indicated in dash-dot lines at 58 in FIG. 7 as being in communication with energy-storage device 52 (and/or power source 130) to indicate that the controller may be adapted to be powered thereby. It is also within the scope of the present disclosure that the controller, when present, is powered by another suitable power source. The controller may be a computerized, or computer-implemented controller and in some embodiments may include software and hardware components. The controller may be a dedicated controller, in that it is primarily adapted to monitor and/or control the operation of the fuel cell system or fuel processing assembly. It is also within the scope of the present disclosure that the controller, when present, may be adapted to perform other functions.

Figure 8:
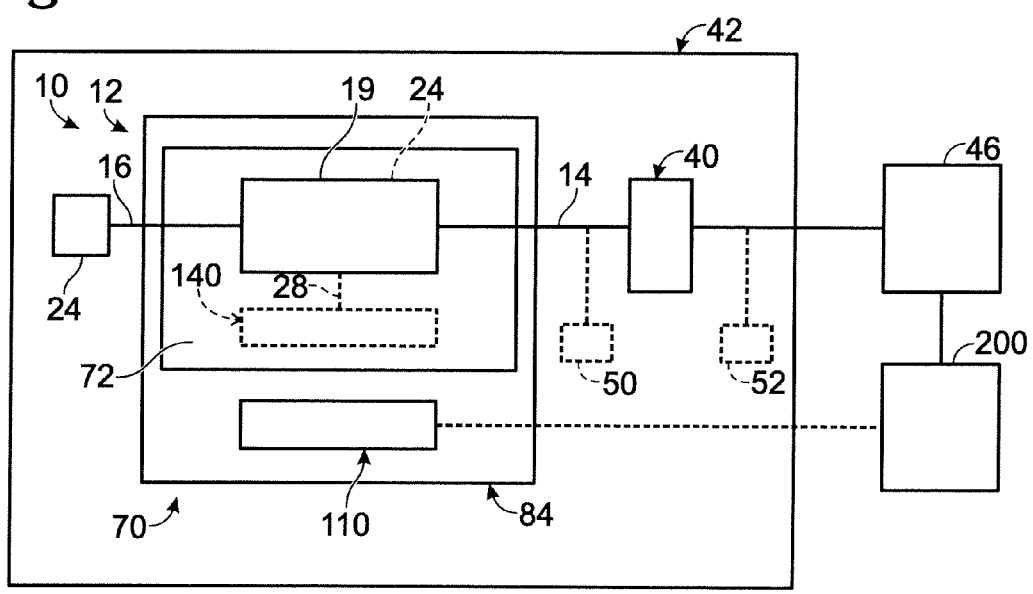
FIG. 8 is a schematic view of a thermally primed hydrogen-producing fuel cell system according to the present disclosure, as well as an energy-consuming device and a primary power source that is normally adapted to provide power to the energy-consuming device.

In FIG. 8, a thermally primed fuel cell system 42 (i.e., a fuel cell system that includes a thermally primed fuel processing assembly 10) according to the present disclosure is shown being adapted to provide backup power to an energy-consuming device 46 that is adapted to be powered by a primary power source 200. In other words, when the primary power source is operational, it satisfies the load applied by energy-consuming device 46. While primary power source 200 is operational and available to satisfy the applied load from energy-consuming device 46, the heated containment structure of thermally primed fuel processing assembly 10 may be operational to maintain at least the hydrogen-producing region 19 of the fuel processor at a threshold hydrogen-producing temperature range and/or within a threshold hydrogen-producing temperature range, such as those described and/or incorporated herein. In such a configuration, fuel cell system 42 is configured to provide backup, or supplemental, power to the energy-consuming device, such as when the primary power source is not operational or is otherwise not available or able to satisfy the applied load from the energy-consuming device. In FIG. 8, only portions of system 42 are shown, and it is within the scope of the present disclosure that system 42 may include any of the components, subcomponents, and/or variants described, illustrated and/or incorporated herein.

When configured to provide backup power to an energy-consuming device 46, system 42 may be configured to detect the operational state of the primary power source via any suitable mechanism and/or may be adapted to initiate the production of hydrogen gas (and thereby initiate the generation of power output 41) responsive to detecting an applied load to the fuel cell system from the energy-consuming device. When system 42 includes, or is in communication with a controller, the controller may include at least one sensor that is adapted to detect whether a load is being applied to the thermally primed hydrogen-producing fuel cell system from the energy-consuming device, and/or whether the primary power source is providing any (or sufficient) power to the energy-consuming device. Responsive at least in part to this detection, the controller may initiate the production of hydrogen gas by sending one or more suitable command signals to the feedstock delivery system to cause stream(s) 16 to be delivered to the hydrogen-producing region of the fuel processing assembly. The controller may be adapted to perform various diagnostics, or system integrity checks responsive to the detection that system 42 is needed to provide a power output to satisfy an applied load from the energy-consuming device. As discussed, the controller may be a computerized, or computer-implemented controller that is adapted to perform various control and/or monitoring functions and/or which may include hardware and software components, may include a microprocessor, and/or may include a digital or analog circuit. The controller, when present, may also simply include a sensor or detector that is adapted to send a command signal to feedstock delivery system 22 responsive to detecting that there is a need for system 42 to being producing a power output.

As indicated in FIG. 8, it is within the scope of the present disclosure that at least the heating assembly 110 of, or associated with, the heated containment structure may be adapted to be powered by the primary power source when the primary power source is available to satisfy the applied load of the energy-consuming device. Accordingly, when the primary power source is operational, it may be configured to supply the applied load of the energy-consuming device, while also providing power to at least the heating assembly of the thermally primed fuel processing system of fuel cell system 42. In such a configuration, the fuel cell system may be maintained in its "primed" operational state, in which at least the hydrogen-producing region thereof is maintained at a suitable temperature for producing hydrogen gas therein responsive to the delivery of a suitable feed stream(s) thereto. However, because the power requirements of the fuel cell system are satisfied by the primary power source while the primary power source is operational, the fuel cell system does not need to generate a sufficient, or even any, power output while in its primed operational state. Similarly, the fuel processing assembly may not be generating any hydrogen gas while in this operational state, even though it is being maintained at a suitable temperature, or within a suitable temperature range, for generating hydrogen gas.

When, and if, the primary power source fails, is offline, or otherwise is unable to satisfy the applied load of the energy-consuming device, the thermally primed fuel cell system is able to generate a power output to satisfy this applied load. Furthermore, because the fuel processing assembly was maintained at a suitable temperature (or temperature range) for generating hydrogen gas, the time required to begin generating the required power output will be considerably less than if the fuel processing assembly was instead maintained at an unheated, or off, operational state. For example, the thermally primed fuel cell system may be able to satisfy the applied load in less than a few minutes, such as less than three minutes, less than two minutes, less than one minute, or even less than forty-five seconds, inclusive of any diagnostics or other self-checks performed by a controller of the system. Expressed in slightly different terms, thermally biased hydrogen-producing fuel cell systems may have a thermally biased response time to begin generating a power output from hydrogen gas produced in the system, with this response time being less than a few minutes, less than two minutes, less than one minute, less than forty-five seconds, etc. This response time will be much shorter than a comparative start up response time if the hydrogen-producing fuel cell system was not a thermally biased hydrogen-producing fuel cell system.

As discussed above, thermally primed fuel cell systems according to the present disclosure may include a hydrogen-storage device and/or an energy-storage device that is undersized for a fuel cell system that does not include a thermally primed fuel processing assembly, such as an assembly that includes a heated containment structure according to the present disclosure. However, the hydrogen storage device and/or energy-storage device may be sized to provide the required hydrogen gas and/or power output during the much shorter time period that elapses for the thermally primed fuel cell system to begin generating a sufficient power output to satisfy the applied load of energy-consuming device 46. For example, this may enable the fuel cell system to provide an uninterruptible backup power supply (UPS) for the energy-consuming device.

INDUSTRIAL APPLICABILITY

Thermally primed fuel processing assemblies and hydrogen-producing fuel cell systems containing the same are applicable to the fuel processing, fuel cell and other industries in which hydrogen gas is produced, and in the case of fuel cell systems, consumed by a fuel cell stack to produce an electric current.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A thermally primed hydrogen-producing fuel processing system, comprising:
 a fuel processing assembly comprising a hydrogen-producing region that contains a reforming catalyst, wherein the hydrogen-producing region is located within a housing that defines an exterior surface and is configured to receive a feed stream containing at least a carbon-containing feedstock and water and, when the hydrogen-producing region is at least within a hydrogen-producing temperature range, to produce from the feed stream a mixed gas stream containing hydrogen gas and other gasses;
 an insulated containment structure including an enclosure, wherein the enclosure includes walls that include inner surfaces that define an internal compartment containing at least the hydrogen-producing region of the fuel processing assembly, wherein the exterior surface of the housing is spaced apart from at least a portion of the inner surfaces, wherein the enclosure includes a feed stream port, which is configured to receive the feed stream into the internal compartment, and further wherein the enclosure includes a product hydrogen port, which is configured to permit at least hydrogen gas from the mixed gas stream to exit the internal compartment;
 a feed stream conduit that is configured to convey the feed stream from the feed stream port to the fuel processing assembly;
 a product hydrogen conduit that is configured to convey at least the hydrogen gas from the fuel processing assembly to the product hydrogen port;
 a heating assembly configured to heat and maintain at least the internal compartment of the insulated containment structure at or above a threshold hydrogen-producing temperature that is within the hydrogen-producing temperature range, wherein the heating assembly is an electrical heater that is configured to receive an air stream and to heat the air stream to generate a heating fluid stream therefrom, and further wherein the enclosure includes an inlet port that is configured to receive the heating fluid stream into the internal compartment and an exhaust port that is configured to permit the heating fluid stream to exit the internal compartment; and
 a controller configured to selectively control the operation of the thermally primed hydrogen-producing fuel processing system to heat and maintain at least the internal compartment of the insulated containment structure at or above the threshold hydrogen-producing temperature during periods in which there is no active demand for the fuel processing assembly to produce the mixed gas stream and the fuel processing assembly is not producing the mixed gas stream such that the hydrogen-producing region will generate the mixed gas stream directly responsive to receipt of the feed stream.

2. A thermally primed hydrogen-producing fuel cell system, comprising:
 the thermally primed hydrogen-producing fuel processing system of claim 1; and
 a fuel cell stack configured to receive an oxidant and a fuel stream, wherein the fuel stream includes hydrogen gas from the mixed gas stream, and further wherein the fuel cell stack is configured to generate a fuel cell power output from the fuel stream and the oxidant to satisfy an applied load from an energy-consuming device when a primary power source that is normally configured to satisfy the applied load is not providing a primary power output to satisfy the applied load.

3. The thermally primed hydrogen-producing fuel processing system of claim 1, wherein the thermally primed hydrogen-producing fuel processing system is in electrical communication with a primary power source that is normally configured to provide a primary power output to satisfy an applied load, wherein the heating assembly includes an electrical heating assembly and is configured to heat and maintain the internal compartment of the insulated containment structure at or above the threshold hydrogen-producing temperature during periods in which the primary power source is providing the primary power output to satisfy the applied load, and further wherein the heating assembly is configured to be powered by the primary power source when the primary power source is providing the primary power output.

4. The thermally primed hydrogen-producing fuel processing system of claim 3, wherein the heating assembly is a first heating assembly that is configured to not generate and provide heat to the internal compartment of the enclosure during periods in which the primary power source is not providing the primary power output, and further wherein the thermally primed hydrogen-producing fuel processing system further includes a second heating assembly that is configured to provide heat to the hydrogen-producing region when the primary power source is not providing the primary power output.

5. The thermally primed hydrogen-producing fuel processing system of claim 1, wherein the heating assembly is configured to stop heating and maintaining the internal compartment at or above the threshold hydrogen-producing temperature when the fuel processing assembly is producing the mixed gas stream.

6. The thermally primed hydrogen-producing fuel processing system of claim 1, wherein the heating assembly is configured to stop heating and maintaining the internal compartment after the fuel processing assembly produces the mixed gas stream.

7. The thermally primed hydrogen-producing fuel processing system of claim 4, wherein the second heating assembly is positioned within the enclosure and is configured to receive and combust a gaseous fuel stream to provide heat to at least the hydrogen-producing region of the fuel processing assembly when the fuel processing assembly is producing the mixed gas stream.

8. The thermally primed hydrogen-producing fuel processing system of claim 1, wherein the hydrogen-producing region is configured to produce the mixed gas stream from the feed stream directly responsive to receipt of the feed stream and without requiring a startup heating period after an active demand for the thermally primed hydrogen-producing fuel processing system to produce the mixed gas stream.

9. The thermally primed hydrogen-producing fuel processing system of claim 1, wherein the feed stream includes methanol and the threshold hydrogen-producing temperature is between 200° C. and 350° C.

10. The thermally primed hydrogen-producing fuel processing system of claim 1, wherein the fuel processing assembly further comprises a purification region configured to receive at least a portion of the mixed gas stream and to produce a product hydrogen stream therefrom, wherein the product hydrogen stream includes at least one of a greater concentration of hydrogen gas and a lower concentration of at least one of the other gasses present in the mixed gas stream, wherein the purification region is within the internal compartment, wherein the purification region includes at least one hydrogen-selective metal membrane, and further wherein the product hydrogen conduit is configured to convey the product hydrogen stream from the purification region to the product hydrogen port.

11. The thermally primed hydrogen-producing fuel processing system of claim 1, wherein the thermally primed hydrogen-producing fuel processing system is configured to have a thermally biased response time to produce the mixed gas stream with the fuel processing assembly upon an active demand for the fuel processing assembly to generate the mixed gas stream, wherein the thermally biased response time is shorter than a startup response time of a comparative hydrogen-producing fuel processing system that is not a thermally primed hydrogen-producing fuel processing system and that does not include the controller, and further wherein the thermally biased response time is less than 2 minutes.

12. A supplemental power system configured to provide supplemental electrical power to an applied load when a primary power source is unable to satisfy the applied load, the supplemental power system comprising:
the thermally primed hydrogen-producing fuel processing system of claim 1, wherein the thermally primed hydrogen-producing fuel processing system is configured to provide at least a portion of the mixed gas stream to a fuel cell stack that is configured to receive an oxidant and the portion of the mixed gas stream and to produce a fuel cell power output therefrom to satisfy at least a portion of the applied load when the primary power source is unable to satisfy the applied load, and further wherein the controller is configured to control the operation of the supplemental power system.

13. The supplemental power system of claim 12, wherein the controller further includes a detector configured to detect that the primary power source is unable to satisfy the applied load, and further wherein the controller is configured to initiate delivery of the feed stream to the hydrogen-producing region responsive to the detector detecting that the primary power source is at least one of unable to satisfy the applied load or not providing sufficient power to satisfy the applied load.

14. The supplemental power system of claim 12, wherein the controller is configured to initiate delivery of the feed stream to the hydrogen-producing region responsive to the primary power source being unable to satisfy the applied load.

15. The supplemental power system of claim 12, wherein the heating assembly is a first heating assembly, wherein the thermally primed hydrogen-producing fuel processing system further includes a second heating assembly configured to provide heat to at least the hydrogen-producing region of the fuel processing assembly when the fuel processing assembly is producing the mixed gas stream, wherein the controller is configured to initiate heating by the second heating assembly responsive to the primary power source being unable to satisfy the applied load, and further wherein the primary power source being unable to satisfy the applied load includes at least one of the primary power source not providing any power to the applied load and the primary power source not providing sufficient power to satisfy the applied load.

16. A method for controlling the operation of the thermally primed hydrogen-producing fuel processing system of claim 1, the method comprising:
heating, during a period in which there is no active demand for the hydrogen-producing region to produce the mixed gas stream containing hydrogen gas as a majority component and in which the hydrogen-producing region is not producing the mixed gas stream, at least the hydrogen-producing region of the fuel processing assembly to at least the threshold hydrogen-producing temperature at which the hydrogen-producing region is configured to produce the mixed gas stream from the feed stream;
maintaining the hydrogen-producing region at or above the threshold hydrogen-producing temperature during the period;
delivering the feed stream to the hydrogen-producing region directly responsive to an active demand for the mixed gas stream; and producing the mixed gas stream in the hydrogen-producing region.

17. The method of claim 16, wherein the heating does not utilize a portion of the mixed gas stream, wherein the method includes ceasing the heating at least after the producing, wherein the method includes initiating combustion heating of at least the hydrogen-producing region after the producing, and further wherein the combustion heating utilizes a portion of the mixed gas stream as a combustible fuel.

18. The method of claim 16, wherein the method further includes detecting the active demand and initiating the delivering responsive thereto.

19. The method of claim 18, wherein the producing includes producing the mixed gas stream within two minutes of the detecting.

20. The method of claim 16, wherein the period is a period in which a primary power source is providing an electrical output to satisfy an applied load, and wherein the method further includes producing, with at least a portion of the mixed gas stream and an oxidant, an electrical output from a fuel cell stack, and further wherein the method further includes satisfying at least a portion of the applied load with the electrical output from the fuel cell stack.

21. The thermally primed hydrogen-producing fuel processing system of claim 1, wherein the controller is further configured to heat and maintain the hydrogen-producing region at or above the threshold hydrogen-producing temperature during periods in which no hydrogen-consuming process is configured to receive the mixed gas stream.

22. The thermally primed hydrogen-producing fuel processing system of claim 7, wherein the enclosure further includes an air inlet port, which is configured to receive an air stream that is configured to be supplied to the second heating assembly, wherein the second heating assembly is configured to generate a combustion exhaust stream from the gaseous fuel stream and an air stream, and further wherein the enclosure includes an exhaust port that is configured to permit the combustion exhaust stream to exit the internal compartment.

23. The thermally primed hydrogen-producing fuel processing system of claim 4, wherein the second heating assembly is external to the enclosure and is configured to receive and combust a gaseous fuel stream to generate a combustion exhaust stream, wherein the enclosure includes an inlet port that is configured to receive the combustion exhaust stream into the internal compartment and an exhaust port that is configured to permit the combustion exhaust stream to exit the internal compartment.

24. The thermally primed hydrogen-producing fuel processing system of claim 1, wherein the system further includes a temperature-modulating structure that is located within the internal compartment and selectively defines a subcompartment within the internal compartment with a temperature that is different from a temperature of a remainder of the internal compartment.

25. The thermally primed hydrogen-producing fuel processing system of claim 1, wherein the system further includes a vaporization region that is configured to receive the feed stream and to generate a vaporized feed stream therefrom, wherein the vaporization region is located within the internal compartment, wherein the feed stream conduit is configured to convey the feed stream from the feed stream port to the vaporization region, and further wherein the system includes a vaporized feed stream conduit that is configured to convey the vaporized feed stream from the vaporization region to the hydrogen-producing region.

26. The thermally primed hydrogen-producing fuel processing system of claim 1, wherein the heating assembly is configured to maintain the internal compartment within ±25° C. of a selected threshold temperature that is within the hydrogen-producing temperature range.

27. The thermally primed hydrogen-producing fuel processing system of claim 10, wherein the purification region is located within the housing.

28. The thermally primed hydrogen-producing fuel processing system of claim 10, wherein the purification region is external to the housing, wherein the system further includes a mixed gas stream conduit that is configured to convey the mixed gas stream from the hydrogen-producing region to the purification region, and further wherein the mixed gas stream conduit is located within the internal compartment.

* * * * *